United States Patent [19]

Coon et al.

[11] Patent Number: 4,829,395
[45] Date of Patent: May 9, 1989

[54] LOAD BEAM/ASSEMBLY

[76] Inventors: Warren Coon, 730 Kristen Ct.; Carl J. Carlson, 4548 Via Clarice, both of Santa Barbara, Calif. 93111

[21] Appl. No.: 228,832

[22] Filed: Aug. 3, 1988

Related U.S. Application Data

[63] Continuation of Ser. No. 773,331, Sep. 6, 1985, abandoned.

[51] Int. Cl.⁴ .......................... G11B 5/49; G11B 21/16
[52] U.S. Cl. .................................. 360/104; 360/98.01; 360/103
[58] Field of Search ........................ 360/103, 104, 98

[56] References Cited

U.S. PATENT DOCUMENTS

| | | | |
|---|---|---|---|
| 3,702,461 | 11/1972 | Cantwell | 360/103 |
| 3,713,121 | 1/1973 | Fasano | 340/174.1 |
| 3,723,980 | 3/1973 | Gabor | 360/98 |
| 3,786,457 | 1/1974 | Kahn | 340/174.1 |
| 3,864,750 | 2/1975 | Applequist | 360/98 |
| 3,931,641 | 1/1976 | Watrous | 360/104 |
| 3,984,872 | 10/1976 | Beecroft | 360/103 |
| 4,019,205 | 4/1977 | Salmond et al. | 360/98 |
| 4,107,748 | 8/1978 | Ho | 360/104 |
| 4,167,765 | 9/1979 | Watrous | 360/104 |
| 4,286,297 | 8/1981 | Root et al. | 360/104 |
| 4,347,535 | 8/1982 | Dalziel | 360/104 |
| 4,379,315 | 4/1983 | Schuler | 360/105 |
| 4,391,035 | 7/1983 | Van de Bult | 29/603 |
| 4,399,476 | 8/1983 | King | 360/104 |
| 4,408,238 | 10/1983 | Hearn | 360/104 |
| 4,713,706 | 12/1987 | Oosaka et al. | 360/104 |
| 4,731,920 | 3/1988 | Nishijima et al. | 360/104 |

OTHER PUBLICATIONS

Burns et al, "Retention . . . Assembly", IBM Tech Disc Bull, vol. 23, Dec. 1980, p. 2952.

Primary Examiner—Robert S. Tupper
Attorney, Agent, or Firm—Spensley Horn Jubas & Lubitz

[57] ABSTRACT

An improved load beam/flexure assembly for mini Winchester disk drives is disclosed. The load beam is substantially straight where it is attached to the arm as opposed to the prior art 2° 20′ bend. Furthermore, the side flange edges of the load beam are tapered towards the slider end of the load beam and the side flanges have wire tube guiding tabs, allowing for the elimination of the split finger so that the slider arm end is substantially flat. The flexure is also designed to have the surface that is attached to the slider to be substantially parallel to the elongated load beam, instead of the prior art 2° 20′ angle of the prior art. Also, the load beam arm end is secured to the arm by ball staking with the arm end of the load beam positioned between the insert and the arm with the insert having a boss passing through the load beam. The result of these combinations is a reduction of the disk to disk spacing of approximately 50%, from 300 mils to about 160 mils.

13 Claims, 3 Drawing Sheets

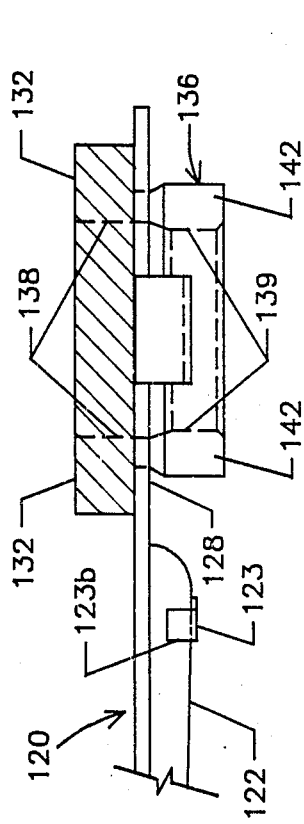
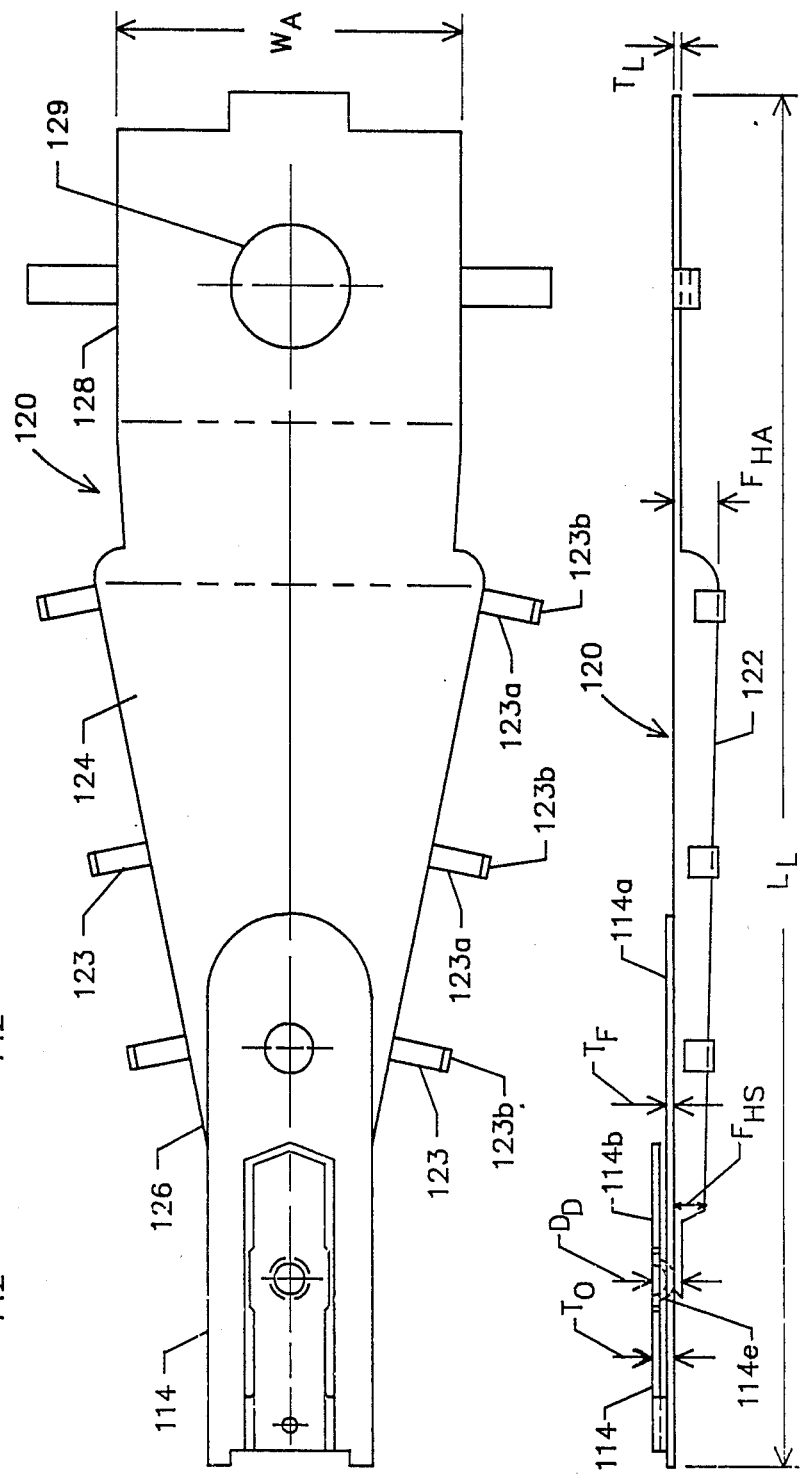
FIG. 3
FIG. 4

LOAD BEAM/ASSEMBLY

This is a continuation of application Ser. No. 773,331 filed on Sept. 6, 1985, now abandoned.

BACKGROUND OF THE INVENTION

1. Area of the Invention

This invention relates to load beam/flexure assemblies for Winchester disk drives which are used for supporting magnetic read/write heads adjacent to the rotating disks. More particularly, this invention relates to such load beam/flexure assemblies for mini-composite and mini-monolithic Winchester disk drives (hereinafter referred to as "mini Winchester disk drives").

2. Description of the Prior Art

Mini Winchester disk drives have a plurality of flat, circular spaced apart disks 12 (FIG. 1) rotating about a common spindle (not shown). In typical mini Winchester disk drives, the disk-to-disk spacing ($S_{DD}$) is 300 thousandths of an inch, (hereinafter 300 mils).

The data is stored in the magnetic media formed on the surface of the disks Typically, the data is divided into groupings called tracks that are concentric rings similar to the annular growth rings on a tree. In most Winchester disk drives, the concentric rings are on both sides of the disk. A magnetic read/write head is positioned above each side of the disk. As the disk is spun beneath the head, the read/write head can magnetize the magnetic media in the track, thereby writing onto the track. After data is stored on the track, the read/write head can be positioned above a track and, as the disk spins, the read/write head can read the magnetic pattern stored on the disk in the track. To write onto or read from different tracks, the read/write head merely needs to be moved towards or away from the spindle A read/write element (not shown) for each disk is positioned immediately adjacent to each flat surface of the disk 12a and 12b as the disk spins beneath it. The read/write element is mounted on a slider 16 which has an air bearing surface positioned immediately adjacent to the flat surface of the disk. As the disk spins, the air following the disk applies pressure to the slider's air bearing surface and lifts the slider and the read/write element off of the surface of the disk.

Positioning the slider body over the disk is accomplished by attaching the slider body to a component called a flexure 14. The flexure 14 allows the slider body to gimbal for pitch, roll and transverse motion, but restricts the slider's motion in the radial and circumferential directions of the disk. To support the flexure 14 in the proper position, each flexure is attached to an elongated load beam 20, which is in turn attached to an arm 30 coupled to the carriage 38 of the Winchester disk drive. The portion of the flexure 14 that is attached to the slider 16 is called the tongue portion and the portion that is fastened to the load beam is called the body portion The load beam is generally made of steel and acts as a leaf spring to bias the slider 16 towards the disks.

Typically, each load beam 20 comprises an elongated, flat load beam base 24 with two side flanges 22 integral with and at the sides of the load beam base 24. One end of the load beam (the slider end 26) is coupled to the flexure while the other opposed end (the arm end 28) is adapted for attaching the beam 20 to the arm 30. The slider end 26 has a fork-like structure called a split finger 29 that projects above the side flanges 22. This split finger 29 is used for holding a wire tube (not shown) in place against the top surface of the load beam base 24. The wire tube contains the wires that connect the read/write head (not shown) to the read/write circuitry of the Winchester disk drive.

Usually the load beam 20 is attached to the arm 30 via a flat insert 32. The flat arm end 28 of the load beam is welded to the insert 32. The insert is then bolted to the arm by a bolt 36 with the insert 32 positioned between the arm end 28 of the load beam and the arm 30. Typically, the arm 30 is then attached to the carriage 38 of the Winchester disk drive via a bolt 40. The arms with the load beams attached form an interdigitated structure as seen in FIG. 1.

It is important that the air bearing surface of the slider 16 be substantially parallel to the disk surface. In prior art devices, the tongue portion of the flexure 14 is at approximately a 2° 20' the base 24 of the load beam. To compensate for this 2° 20' angle, when the load beam/flexure assembly is mounted in the disk drive, the angle between the surface of the arm 30 and the base 24 of the load beam 20 is also 2° 20'. The two 2° 20' angles may be thought of as interior, corresponding angles formed by the "parallel lines" of the surface of the arm 30 and the disk surface (12a or 12b) and with the load beam 20 being the transversal. Thus, the slider's 16 air bearing is substantially parallel to the surface of the disk.

Furthermore, in such prior art mini Winchester disk drives, when the load beam/flexure assemblies are inserted into the drive, there must be sufficient clearance between the adjacently positioned sliders 16 and the disk 12 and the adjacently positioned load beams such as 20a and 20b. If there is any interference between sliders and disks during assembly, damage will be likely to occur. Typically in the prior art, adequate clearance has been accomplished by keeping a spacing between adjacent disks ($S_{DD}$) at about 300 mils. However, this relatively large disk to disk spacing ($S_{DD}$) frustrates efforts to reduce the total size of the mini Winchester disk drive.

A further consideration in the prior art is that it is sometimes necessary to remove a particular load beam/flexure assembly for repairing or replacing the Winchester disk drive. Usually, bolts 40 and 36 are used to allow for assembly and disassembly. A disadvantage of using these bolts 36 is that the bolts 36 are so small that it is easy to strip a thread on the bolt in the mating hole or not adequately clamp the load beam 20 to the arm 30. Furthermore, these bolts 36 and the tapped mating holes are quite expensive.

Not only are the bolts 36 costly, but machining the carriage 38 and the arms 30 so the arms will be precisely positioned is expensive. The machining operation may contribute as much as about one third of the overall cost of the carriage. Also, the number of parts required in this structure increases the overall cost.

Furthermore, if it is necessary to remove one of the read/write heads for repairs, the load beam to which the head is attached cannot be removed without first removing the arm. The arm must be removed because the bolts 36 are not accessible in the assembled drive. Thus, the entire arm 30 must be unbolted from the carriage 38. Furthermore, each of the wires of all of the heads must be disconnected from the read/write circuitry of the Winchester disk drive. Since as many as four heads may be attached to an arm, being required to disconnect all of the wires for each head when only one head needs to be repaired is highly undesirable.

Thus, it is an object of this invention to provide for a compact mini Winchester disk drive structure. It is a further object of this invention to have such mini Winchester disk drive have load beams that are easily removable and reattachable while eliminating the attachment bolts.

SUMMARY OF THE INVENTION

These and other objects are accomplished by using a straight load beam/flexure assembly (i.e., the 2° 20' angle when load beam is assembled is eliminated) where the flexure has a tongue portion that is parallel to the body of the load beam. Furthermore, the insert is no longer positioned between the arm end and the arm; rather the arm end of the load beam is now positioned between the insert and the arm, and ball staking is used to replace the bolts. By using ball staking instead of bolts to attach the beam to the arm, the carriage and the arms may be unitary, reducing the number of parts and the expense of machining of the carriage and arms. Furthermore, the side flanges of the load beam are tapered towards the slider end. Each side flange may have a plurality of wire tube guiding tabs spaced apart from each other that hold the wire tube in position along the side flange, thereby eliminating the split fork. The combination of all these design changes provides for a disk-to-disk separation of only about 160 mils.

BRIEF DESCRIPTION OF THE DRAWINGS

FIG. 3 is a partial side plan view of a load beam attached to an insert according to the present invention.

FIG. 4 is a top plan view and side view of a load beam/flexure assembly made according to the present invention.

DETAILED DESCRIPTION OF THE INVENTION

Figure 2:
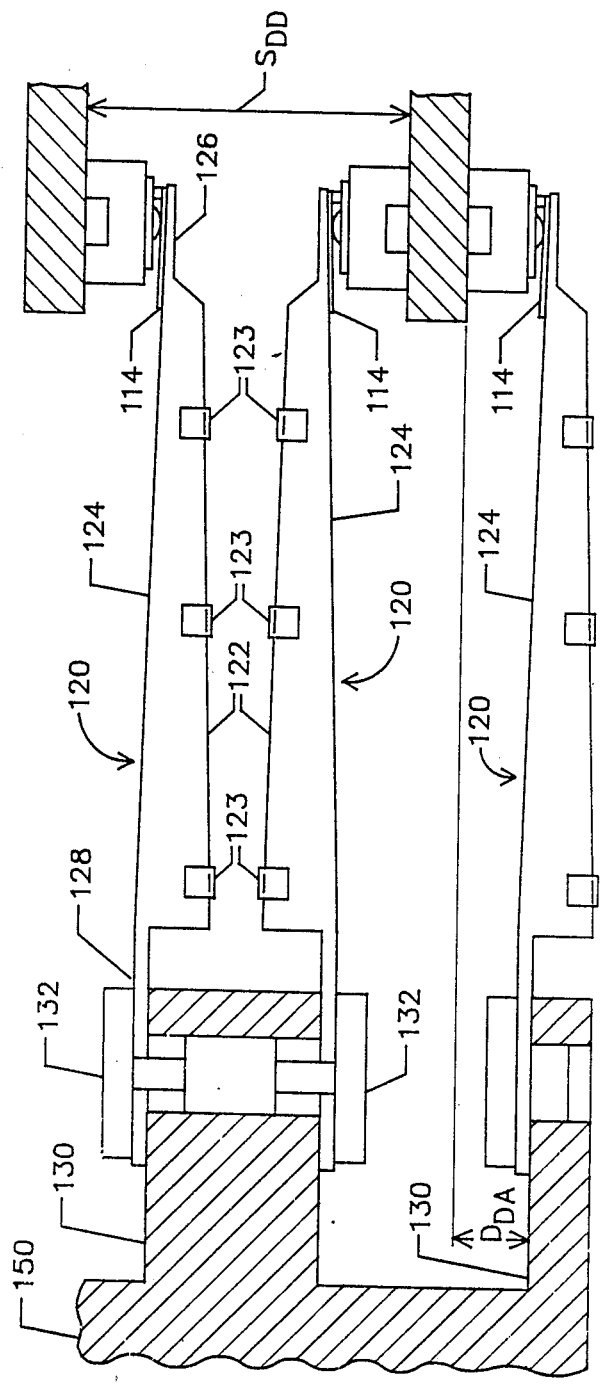
FIG. 2 is a partial plan side view of a Winchester Disk Drive made according to the present invention.

FIG. 2 illustrates an overall structure in accordance with a preferred embodiment of the present of the invention. Although the overall interdigitated structure is similar in some respects to the prior art, substantial changes yield a much more compact structure. By following the principles of the instant invention, a greatly diminished disk to disk spacing ($S_{DD}$) of 160 mils can be obtained as opposed to the $S_{DD}$ of 300 mils typically achieved by the prior art. The results of this new construction are clearly shown in FIG. 2.

When the load beam 120 is assembled into a Winchester disk drive, there is substantially no angle between the load beam 120 and the arm 130, as opposed to the prior art 2° 20' bend between the surface of the arm and the load beam body. Furthermore, as will be described in more detail below, the flexure 114 is designed such that the flexure's tongue portion 114b (FIG. 5), which is attached to the slider, is parallel to the load beam base 124. Each side flange 122 of the load beam has crimped wire tube tabs 123 which are used for positioning the wire tube. Thus, the split finger of the prior art is eliminated. Further, the side flanges 122 taper towards the slider end of the load beam. All of these features combine to allow a reduction of the disk to disk spacing.

Furthermore, the means for attaching the load beam 120 to the arm 130 has been changed to allow for even further decreases in the disk to disk spacing $S_{DD}$. The insert 132, which has a height of about 20 mils, is no longer positioned between the arm end 128 of the load beam and the arm 130. Instead, the arm end 128 of the load beam 120 is positioned between the insert 132 and the arm 130. The prior art screws or bolts for attaching the insert and load beam to the arm have been eliminated. Instead of using bolts, ball staking, which will be described below, is used. The result is a gain of approximately 140 mils in disk-to-disk spacing. Unlike prior art spacing of approximately 300 mils, disk-to-disk spacing SDD has been reduced to approximately 160 mils—a reduction of almost 50%.

Figure 5:
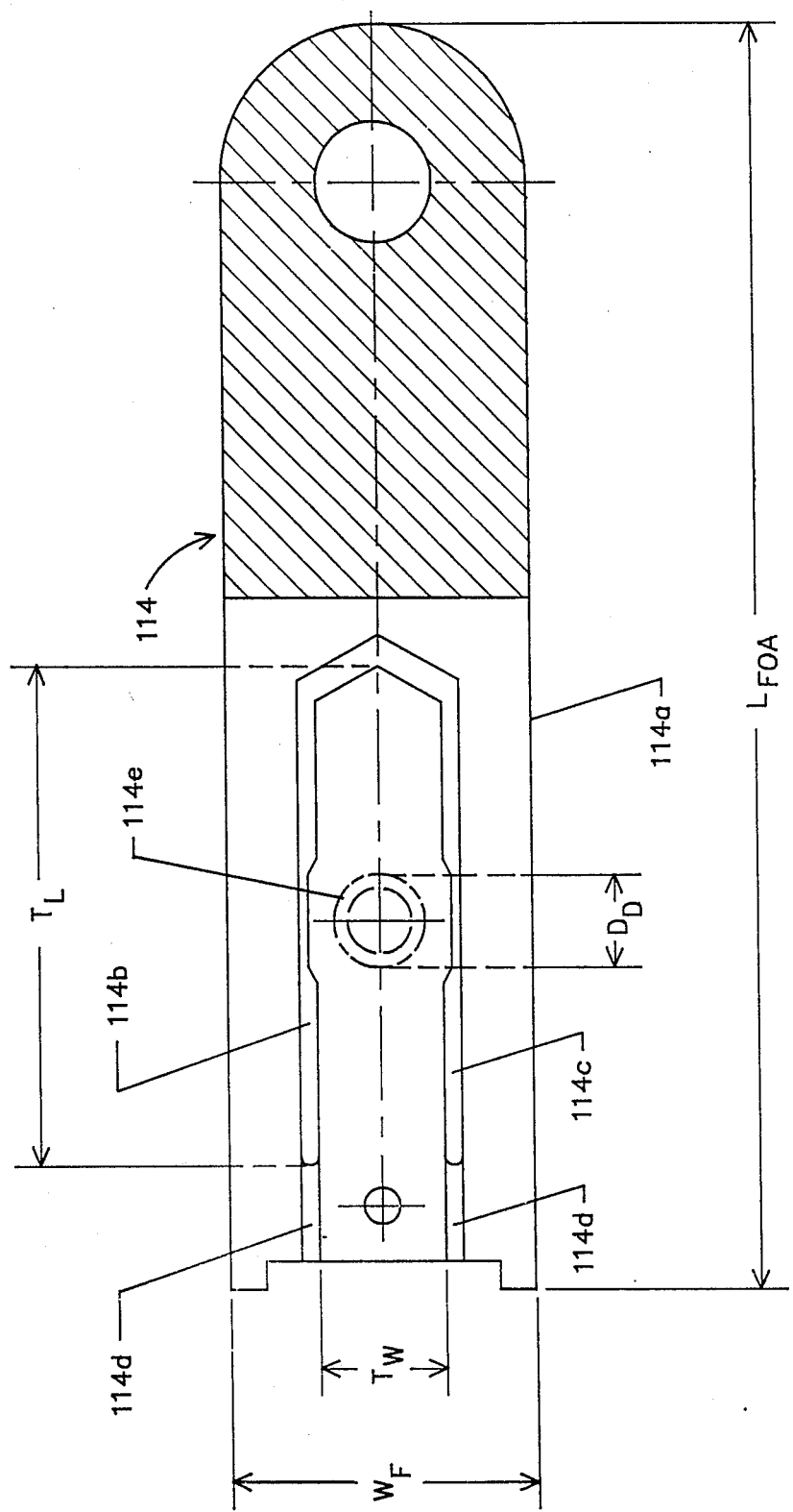
FIG. 5 is a top plan view of a flexure made according to the present invention.

Referring now to FIGS. 4 and 5, the flexure 114 may be more clearly seen. The flexure 114 is of a unitary construction and has a tongue portion 114b that is offset in a parallel manner by a specific distance from a flat body 114a surface of the flexure. The body portion 114a encloses a cutout region 114c over which the tongue portion 114b is suspended. The coupling of the tongue portion 114b to the body portion 114a is accomplished by forming two strips 114d. The height of the strips 114d is substantially identical throughout the length of the legs so that the tongue portion 114b is parallel to the body portion 114a. In the middle of the tongue region is a hemispherical dimple 114e protruding from the tongue portion 114b towards the flat body portion. The height of the hemispherically shaped 114e dimple is precisely the same as the offset distance so that when the flexure 114 is attached to the load beam 120, the crown of the dimple 114e rests against the bottom surface of the load beam. The entire flexure is of a unitary construction; i.e., the flexure is formed from a piece of metal.

Several dimensions of the preferred embodiment of the flexure are given in table 1 below.

TABLE 1

| Symbol | Name | Dimension (mils) |
|---|---|---|
| $L_{FOA}$ | Overall Flexure Length | 314.7 |
| $W_F$ | Flexure Width | 75 |
| $T_L$ | Tongue Length | 166 |
| $T_W$ | Tongue Width | 39 |
| $T_O$ | Tongue Offset | 6 |
| $D_D$ | Dimple Diameter | 30 |
| $D_H$ | Dimple Height | 6 |
| $T_F$ | Flexure Thickness | 2 |

Referring now to FIG. 4, the overall structure of the load beam 120 may be seen. The load beam 120 is made from an elongated piece of stainless steel. Both the slider end 126 and the arm end 128 are substantially flat. Formed between the slider 126 end and the arm end 128 are side flanges 122 that are formed by bending the outer edge portions of the load beam at approximately a 90° angle with respect to the base 124 of the load beam.

The side flanges 122 on the load beam 120 have been tapered to permit closer placement of adjacent load beams during assembly. The highest part of each side flange is at the end of the side flange closest to the arm end 128, and each side flange 122 tapers towards the slider end 126. Total elimination of the side flange has been found to cause too much resonance in the load beam 122. However, the applicant has found that the load beam can be tapered at the slider end to a height of about 20 mils while the height at the end of the side flange nearest the arm end is about 30 mils.

Integral with each side flange 122 are a plurality of spaced apart wire tube guiding tabs 123 that define a channel for holding a wire tube (not shown). The tabs are comprised of two portions: an upper portion 123a that is bent at a 90° angle to the side flange and a lower portion 123b that is offset from the side flange and is substantially perpendicular to the upper portion 123a. During assembly of the load beam/flexure, the wire tube (not shown) may be positioned adjacent to either side flange. The wire tube guiding tabs 123 may then be crimped towards the side flange 12 and hold the wire tube firmly in place. By using the tabs, the split fork which was used to position the wiring tube on the load beam 122 is eliminated. Alternatively, the wiring tube may be positioned between the flanges 122 and the wire tube guiding tabs may be eliminated. A tab similar in construction to the tabs 123 projects from the flange near the slider-end over the tube and is crimped against the tube. A small split fork projects along the center line of the load beam between the arm end of the flanges and holds the tube firmly in place. The height of the split fork is less than the height of the flanges. By eliminating the split fork of the prior art near the slider-end, the slider end 126 of the load beam is flat. This allows for a decrease of the disk to disk spacing.

Before the load beam is assembled into the minicomposite Winchester disk drive, the attachment end of the arm forms about a 30° angle with the remainder of the load beam. However, when the beam is assembled into the interdigitated structure shown in FIG. 2, the load beam 120 is straight, with the 2° 20' angle of the prior art substantially eliminated. This is accomplished by having the disk to arm displacement ($D_{DA}$) be substantially equal to the thickness of the load beam plus the height of the dimple plus the height of the slider plus clearance. Thus, the load beam acts as a leaf spring biasing the slider against the disk surface but the substantial angle of 2° 20' in the prior art has been eliminated.

Overall dimensions of the load beam 120 are given in Table 2 below.

TABLE 2

| Symbol | Name | Dimension (mils) |
| --- | --- | --- |
| $L_L$ | Load Beam Length | 1209 |
| $L_F$ | Flange Length | 623 |
| $F_{HA}$ | Flange Height Arm End | 30 |
| $F_{HS}$ | Flange Height Slider End | 20 |
| $W_A$ | Width at Arm End | 245 |
| $T_L$ | Thickness of Load Beam Base | 3 |

Referring now to FIG. 3, the ball staking or pin staking technique is shown by which the load beam 120 is attached to the arm 130. The load beam is welded to the insert 132 which has a boss 136 projecting from the bottom surface of the insert. The boss 136 passes through a hole 129 (FIG. 4) in the arm end of the load beam. The insert 132 defines an interior passage 138 that narrows at region 139. When the load beam is attached to the arm, the boss 136 is inserted into its mating hole in the arm. The hole 129 in the arm may be a variety of shapes, such as circular or has a hexagonal. A ball or pin with a diameter slightly larger than the narrow region 139 is inserted into the passage 138 of the insert. When the ball or pin reaches the narrowest portion of the passage, the ball or pin will push out or swage the material 142 adjacent to the passage causing the outer edges of the boss to expand. This allows for the load beam to be held fixedly in place.

Referring now to FIG. 2, the arms 130 are now part of the carriage 150, forming a unitary carriage/arm construction; i.e., they now form a unitary "comb-like" structure. Each arm 130 is spaced apart from and parallel to the adjacent arms, much like the adjoining teeth of a comb. The arms are joined by the remainder of the carriage 150, which acts as the spine of the comb-like unitary structure.

Figure 1:
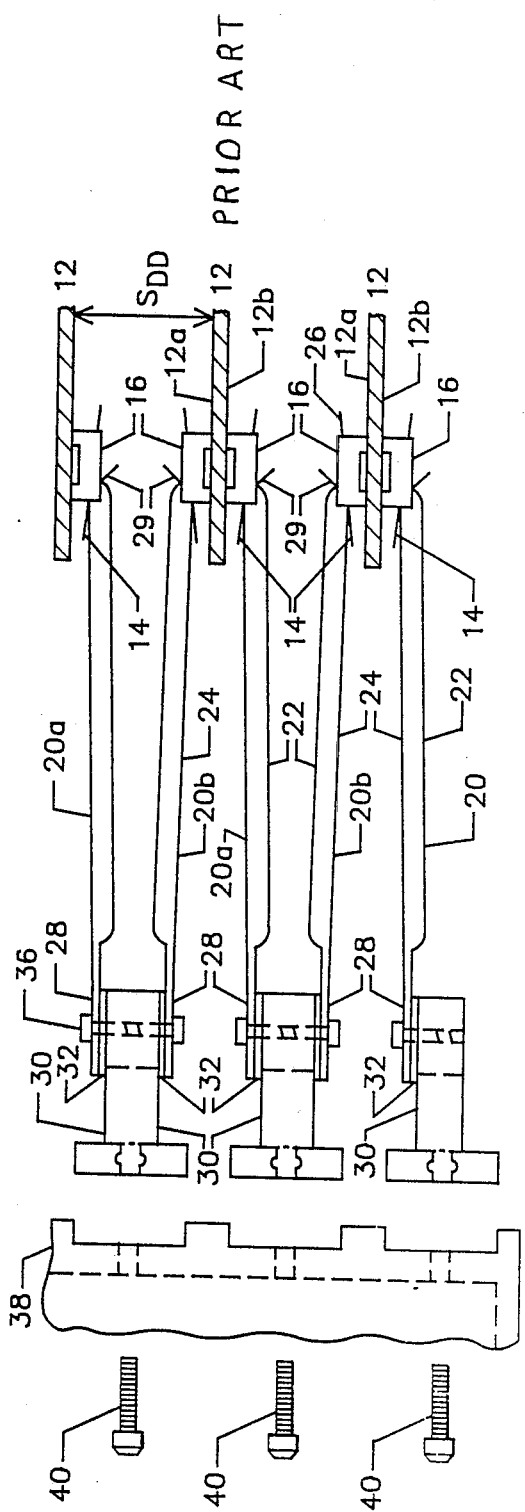
FIG. 1 is a partial plan side view of a mini Winchester disk drive made according to the prior art.

By using the unitary comb-like carriage/arm structure, the number of components has been reduced over the typical prior art mini Winchester disk drive. In particular, the separate arms 30 and bolts 40 (FIG. 1) have been eliminated. Also, machining the unitary structure is much less expensive than machining both the prior art carriage 38 and the arms 30.

Thus, by the use of the new flexure with the tongue portion 114b being substantially parallel to the load beam, and by eliminating the 2° 20' angle of the load beam in the assembled unit, a substantial reduction of the disk to disk spacing may be achieved. Furthermore, by having the arm end of the load beam positioned between the insert and the arm and by using tabs along the side flange or other means instead of a split fork near the slider end, substantial reduction of the disk to disk spacing can also be attained. In addition, because ball staking is used instead of bolts 36 and accompanying tapped holes, the component cost is substantially reduced. With the preferred embodiment disclosed, the disk to disk spacing can be reduced from about 300 mils to 160 mils.

I claim:

1. A head assembly for a mini-Winchester disk drive which is provided with a plurality of magnetic disks, comprising: a one-piece carriage having a plurality of integral, parallel, arms which are spaced apart from one another to form a comblike structure such that each arm can be located between a respective pair of magnetic disks in the drive, each arm having an opening: a plurality of read/write heads each arranged to cooperate with a surface of a respective disk; and means supporting each said head from a respective arm, said means comprising, for each said head: an elongated load beam having an arm end provided with an opening, and an opposed end carrying a respective head; and a connecting member having a flat portion and a hollow boss projecting from said flat portion and through said opening in a respective arm, with said beam being sandwiched, and mechanically held, between said flat portion and said respective arm, and said boss being deformed to form a swaged connection with said respective arm.

2. n assembly as defined in claim 1 wherein said means supporting each head further comprise a flexure connecting said head to its associated load beam.

3. An assembly as described in claim 2, wherein the flexure is a unitary piece.

4. An assembly as described in claim 2, wherein the flexure has two flat portions with the first portion being coupled to the load beam and the second portion being coupled to the head, wherein the two portions are substantially parallel to each other.

5. An assembly as defined in claim 2 wherein said flexure and said flat portion of said connecting member associated with a given beam are adjacent the same surface of the associated beam.

6. An assembly as defined in claim 1 wherein the openings in said arms are vertically aligned.

7. An assembly as defined in claim 1 wherein each said connecting member defines a hole which passes through, and narrows in, said hollow boss.

8. A head assembly as defined in claim 1 wherein said beams extend parallel to one another and to the disks when said assembly is associated with the disks.

9. A head assembly as defined in claim 1 wherein each said beam has two opposed sides and is provided with a pair of flanges, each flange being formed integral to one side of said beam and tapering from a first height adjacent to said respective arm to a second height, less than said first height, adjacent said respective head.

10. A head assembly for a mini-Winchester disk drive which includes a plurality of magnetic disks, comprising: a plurality of parallel elongated arms which are spaced apart from one another so that each arm can be located between a respective pair of magnetic disks in the drive; a plurality of read/write heads each arranged to cooperate with a surface of a respective disk; and a plurality of flexible load beams each connected to a respective arm and supporting a respective head, each said beam being mounted to extend parallel to the surfaces of the disks when said head support means are installed in the drive, and each said beam having two opposed sides and being provided with a pair of flanges, each flange being formed integral to one side of said beam and tapering from a first height adjacent to said respective arm to a second height, less than said first height, adjacent said respective head.

11. A head assembly as defined in claim 10 wherein one flange of each said beam has a plurality of spaced apart tabs adapted for holding a tube in place adjacent to said beam.

12. A head assembly as described in claim 11, wherein each load beam further includes a second tab attached adjacent to the arm end, wherein the second tab is adapted for securing a wire coupled to the read/write head in a direction substantially parallel to the length of the load beam.

13. A head assembly as defined in claim 10 wherein one flange of each said beam has a tab projecting toward the other flange for securing a tube.

* * * * *